United States Patent Office 3,007,797
Patented Nov. 7, 1961

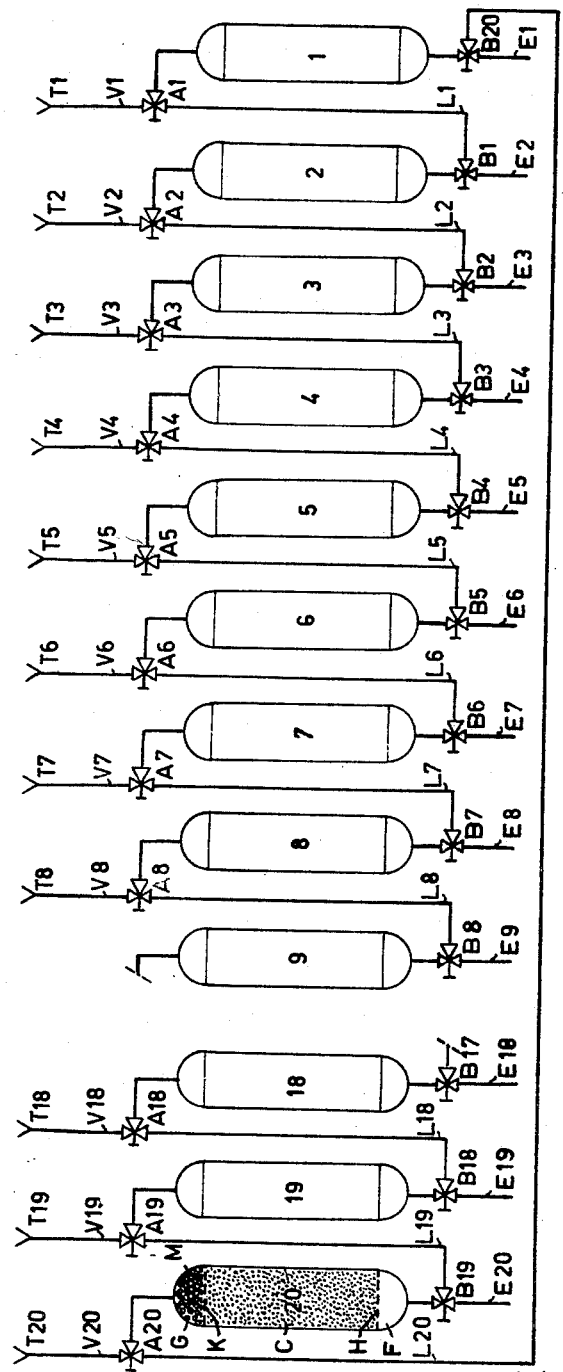

3,007,797
INTERMITTENT COUNTERCURRENT EXTRACTION PROCESS
Willem K. Tiktak, Lutsborgweg 7, Haren, Netherlands, and Anne Chr. H. G. N. Voet, Emmasingel 22, Groningen, Netherlands
Filed July 5, 1957, Ser. No. 670,228
Claims priority, application Netherlands July 6, 1956
10 Claims. (Cl. 99—71)

Extracts of coffee, malt coffee, chicory or mixtures thereof, in general, are brought on the market in the form of liquids with a certain amount of extracted solids or in powdery form.

Powdery coffee-extracts which, for instance, can be obtained by spraying liquid coffee extracts in a warm flow of air can, in respect to their flavor, not be compared with the original coffee. Also many liquid coffee extracts have this drawback. This probably can be attributed to the fact that ordinarily warm extractions are made during which the volatile flavoring substances are lost. This can be prevented for a considerable part, for instance, by extracting freshly roasted coffee first cold and then warm, after which the extracts can be mixed. With the extraction methods hitherto known it was, however, not possible to obtain liquid extracts having a solid content of 30% or more.

The purpose of the invention is to provide an extraction method by which very concentrated aqueous extracts, having a solid content of 30% and more, can be obtained without having a pernicious effect on the flavor of the extracts obtained.

According to the invention an aqueous extract of coffee, malt coffee, chicory or mixtures thereof is prepared by extracting the product to be extracted in counter current with water, the extraction liquid each time being left in contact with an amount of always more extracted product without flowing through. In this manner it is possible to obtain a liquid extract of coffee, malt coffee, chicory or mixtures thereof with a solid content of even 40%. Preferably extraction is effected entirely in the cold. Then a product with an excellent flavor is obtained. When extracting coffee then only about 10% of the originally present substance, which can be extracted, remains in coffee after extracting same in accord with the present invention. These are very bitter flavoring substances. If desired, these can be further extracted from the coffee with warm water; when the extract obtained thereby is added to the extract obtained with the cold extraction, a product with a different flavor is obtained. The fine flavoring substances which are characteristic for coffee, however, should always be extracted from the coffee first by cold extraction in order to prevent their being lost.

In order to prevent the excellent flavor of a liquid coffee extract obtained according to the process of the present invention from being lost, it is recommended not to convert such a product to a powdery coffee extract. In general, however, liquid coffee extracts are not as easily handled, and because of this it is more difficult to sell them. Another characterizing feature of the invention is that a concentrated liquid coffee extract obtained according to the invention is thickened to a paste with the aid of a thickening agent. Such a paste can, for instance, be packed in tubes. Surprisingly the application of a thickening agent has no prejudicial influence on the flavor of the coffee extract.

As thickening agents there may be used: vegetable or animal proteins, agar-agar, gums, tragacanth, pectins in dissolved, thickened or solid form and also products which can be prepared from organic raw materials, such as starch or milk powder, e.g. powdered precooked rice. Also products capable of swelling in the cold or heat which can be prepared from the said products come into consideration as thickening agents.

The mixing with the thickening agent can be carried out in various manners. For instance the liquid extract may be mixed in the cold with the thickening agent or the thickening agent and the liquid extract may be heated together until a sufficient consistency has been reached, or a mixture of thickening agent and liquid extract may be heated until the mixture has a slight viscosity, whereupon it may be cooled. Cooling may take place with the aid of air or water, but also by mixing with water or an extract of lower temperature in which a thickening agent has been dissolved, if desired.

The extract may also be added to a solution of the thickening agent or a solution of the thickening agent may be added to the extract and thereupon one can proceed according to one of the above-indicated methods. Also the thickening agent may be dissolved in milk or milk-containing liquids. Which method is applied depends on the kind of the thickening agent and the consistency desired of the final product.

For the counter-action of oxidation anti-oxidants may be added to the preparation, whilst putrefaction by fungi or bacteria may be counter-acted by the addition of a suitable preserving agent. The pH value of both the extract and the final product is important for the consistency of the finally obtained product and may be controlled by the addition of alkaline or acid reacting auxiliary substances which also may influence the consistency of the preparation apart from their influence on the pH value.

In the annexed drawing it is diagrammatically represented in which manner extraction of, for instance, coffee can be achieved according to the invention.

In the scheme 20 containers are incorporated. These containers are arranged in a circle in such a manner that always the top of a container is connected with the bottom of the subsequent container via one of the lines L, consequently container 1 via line $L_1$ with container 2, etc. Lines $L_1$, $L_2$, $L_3$, etc. each are provided with two three-way cocks $A_1$ and $B_1$, $A_2$ and $B_2$, respectively. From the three-way cocks $A_1$, $A_2$, etc., lines $V_1$, $V_2$, $V_3$, $V_4$, etc., extend in upward direction which at the top debouch in the filling funnels $T_1$, $T_2$, $T_3$, etc.

From the three-way cocks $B_1$, $B_2$, $B_3$ the drawing off lines $E_1$, $E_2$, $E_3$, etc., extend downwardly.

When the plant is operated the container 1 is filled with, for instance, coffee, whereupon the three-way cocks $A_{20}$ and $B_{20}$ are arranged in such a position that the filling funnel $T_{20}$ is connected with the container 1 and the cock $A_1$ is put in such a position that the filling funnel $T_1$ is also connected with this container. When water is poured through the funnel $T_{20}$, container 1 is filled via line $L_{20}$. Deaeration then takes place through line $V_1$. When container 1 has been filled with water, the cocks $A_1$ and $B_{20}$ are closed and the container is left alone for at least 12 hours. Thereupon container 2 is filled with coffee, whereupon the three-way cocks $A_1$ and $B_1$ are put in such a position that the containers 1 and 2 are mutually connected and the three-way cock $B_{20}$ is put in such a position that again water may be supplied to container 1 through funnel $T_{20}$. When this is done the liquid which is already in container 1 is forced to container 2. Deaeration then takes place through line $V_2$. After another 12 hours container 3 can be filled with coffee and water can again be supplied through funnel $T_{20}$. Continuing in this manner the containers are successively filled with coffee and liquid. When container 19 has been filled with coffee and thereupon after supply of the extract from container 18 left alone for at least 12 hours, the drawing off of the first concentrated extract may be begun. For that purpose the three-way cock $B_{18}$ is put in such a position that container 19 is connected with the drawing off line $E_{19}$. When thereupon $B_{18}$ just as three-way cock $A_{18}$ is again put in such a position that containers 18 and 19 are mutually connected, 19 in which there is, consequently, but little extracted coffee, can again be filled with extract from container 18 by supplying water again through funnel $T_{20}$. Thereupon container 20 may be filled with fresh coffee and the coffee in container 1 which has been most strongly extracted may be replaced by fresh coffee. For that purpose the liquid in container 1, which, consequently contains yet little extraction substances, is to be drawn off via line $E_1$. When this has been done, 1 may be filled with fresh coffee. Thereupon fresh water is supplied to container 2 through funnel $T_1$ and line $L_1$. In all subsequent containers then displacement takes place owing to which container 20, filled with fresh coffee, is contacted with the extract from container 19. When container 20 has been filled with liquid, the entire battery is again left alone for at least 12 hours. In container 1, consequently, there is then no liquid. When, consequently, the entire battery is in operation, there is always no liquid in one of the containers during each resting period. This container then may be provided with fresh coffee. Concentrated extract need not be drawn off with the same intervals as that for which displacement of the liquid takes place in the battery. This will be elucidated in the following example. It is clear that also other numbers of containers may be applied.

EXAMPLE 1

Use was made of a laboratory battery of copper containers. Each container consisted of a hollow cylinder C with a diameter of 60 mm. and a height of 170 mm. which was closed at both sides by the semi-globular elements F and G. At the transition from the lower globular segment to the cylinder there was a perforated plate H. The upper segment G could be unscrewed and in closed position it clamped a perforated plate K. At the top thereof there was a gauze M with a mesh width of 1 mm. square. The product to be extracted, for instance, coffee, was introduced between the two perforated plates H and K. The upper sphere segment G was filled with small loose stones to decrease its free volume. Thereby it was achieved that as little liquid as possible was not contacted with the product to be extracted during the resting periods.

After the battery was in operation for three months, the proceedings were the following on June 11, 1957:

From container 6 the liquid present therein was drawn off;

Container 6 was loosened and the dregs removed therefrom;

Container 6 was filled with 150 g. of fresh coffee;

Via cock $A_6$ preceding it water was poured into container 7 until

Container 5 which at first was empty was entirely filled with extract coming from container 4.

Thereupon the system with mutually closed containers was left alone till the following day.

The proceedings on June 12, 1957

From container 7 the liquid (a diluted extract) present therein was drawn off;

Container 7 was loosened and the dregs removed therefrom;

Container 7 was filled with 150 g. of freshly ground coffee;

Via cock $A_7$ preceding it water was poured into container 8 until:

Container 6 was entirely filled with extract coming from container 5.

As usual and, consequently, just as had been done on June 11, 1957, the system with mutually separated containers was left alone till the following day.

The proceedings on June 13, 1957, recovery day

From container 6 in which there was, consequently, the coffee least extracted, concentrated extract was drawn off.

Via cock $A_7$ preceding it water was poured into container 8 until;

Container 6 was entirely filled with extract coming from container 5.

The containers thereupon were again left alone till the following day.

The proceedings on June 14, 1957

From container 8 the liquid present therein was drawn off.

Container 8 was loosened and the dregs removed;

Container 8 was filled with 150 g. of freshly ground coffee;

Via cock $A_8$ preceding it water was poured into container 9 until

Container 7 was entirely filled with extract coming from container 6.

Hereupon the containers, mutually separated, were again left alone till the following day.

With the exception of Sundays and the days that concentrated extract was drawn off (once in seven days) each day one container was provided with fresh coffee.

The amount of water which was always drawn off from the container which would be provided with fresh coffee amounted to approximately 350 cc.; the extract content hereof was approximately 1%. The dregs removed from the process averaged 120 g. in dried condition and contained 10% of extract substances.

Per week approximately 300 cc. of concentrated extract having a solid content of approximately 38% were drawn off.

The substance balance was as follows:

5 days 150 g. of coffee at 27.6% = 207 g. of extract substance
5 days 120 g. of dregs ad 10% = 60 g. of extract substance
5 days 350 cc. of water ad 1% = 18 g. of extract substance
Recovery day: 300 cc. ad 38% = 114 g. of extract substance
Unknown loss          15 g. of extract substance
                      ___
                      207     207

The amount of water introduced per day into the system amounted to approximately 500 cc.

Hereof 350 cc. were refound as a very diluted extract drawn off from the container which would receive the fresh coffee; 150 cc. was absorbed by the fresh coffee.

It, consequently, appears from the above that the concentrated extract always was drawn off from the container containing the coffee least extracted. On the other hand fresh water was always supplied to the coffee which had been most extracted. Consequently, one is concerned here with a pure counter-current system. Notwithstanding the fact that concentrated extract was drawn off only once a week, it was necessary to supply fresh water each day and that because a container was filled with fresh coffee daily, owing to which it was necessary to displace the liquid through the container daily. This displacement was effected by forcing out, owing to which it was necessary to draw off daily a very dilute extract from the container containing the coffee extracted most and to supply fresh water to the container which would in turn be provided with fresh coffee the following day. In order to prevent the loss of extract substances in dissolved condition, instead of pure water the daily obtained amount of diluted extract may be used for the displacement in the battery. When this is done this extract, however, is yet to be made up with fresh water owing to the amount of moisture which is taken up and retained by the fresh coffee. It is also possible to effect the displacement with the aid of a pump instead of by the influence of gravitation, but when this is done it should be done very carefully so that no mixing of the freshly supplied liquid and the liquid already present takes place in the containers, but only a mere displacement.

The same results as in the above-indicated example were obtained when chicory, malt coffee or mixtures of coffee, chicory and/or malt coffee were started from.

EXAMPLE 2

In this example the preparation is described of a paste of a coffee extract prepared according to Example 1.

10 g. of gelatin were dissolved with heating in 25 cc. of boiling water. To the solution thus obtained 75 cc. of coffee extract with a solid content of 38% which was obtained in Example 1 were added with stirring. As soon as the temperature had fallen to 30° C. stirring was stopped and the mass was left alone. The product obtained could be packed in tubes. A cup of coffee prepared by mixing a certain amount of the thus prepared paste with warm water could not be distinguished from a cup of coffee prepared from freshly roasted ground coffee.

What we claim is:

1. A process for the intermittent countercurrent extraction with cold water of a material selected from the group consisting of coffee, malt coffee, chicory and mixtures thereof which consists essentially of introducing cold water into one of a plurality of zones containing said material and allowing the water to remain in stationary contact with said material in the zone for a dwell period during which time the material is partially extracted thus forming a partial water extract; sequentially adding cold water to said one zone to force the partial water extract by displacement into successive zones containing material which is less extracted than that remaining in the preceding zone until material in a final material-containing zone has been contacted and allowing the partial water extract from each preceding zone to remain in stationary contact with the material in the corresponding successive zone for a dwell period, during which time the material in the successive zone is partially extracted; and removing the water extract from the final zone.

2. A process for the intermittent countercurrent extraction with cold water of freshly ground coffee which consists essentially of introducing cold water into one of a plurality of zones containing said coffee and allowing the water to remain in stationary contact with the coffee in said zone for a dwell period, during which time the ground coffee is partially extracted thus forming a partial water extract; sequentially adding cold water to said one zone to force the partial water extract by displacement into successive zones containing ground coffee which is less extracted than that remaining in the preceding zone until ground coffee in a final coffee-containing zone has been contacted and allowing the partial water extract from each preceding zone to remain in stationary contact with the ground coffee in the corresponding successive zone for a dwell period during which time the coffee in the successive zone is partially extracted; and removing the water extract from the final zone.

3. A process for the intermittent countercurrent extraction with water of a material selected from the group consisting of coffee, malt coffee, chicory and mixtures thereof which consists essentially of introducing cold water into one of a plurality of zones containing said material and allowing the water to remain in stationary contact with said material in the zone for a dwell period during which time the material is partially extracted thus forming a partial water extract; sequentially adding cold water to said one zone to force the partial water extract by displacement into successive zones containing material which is less extracted than that remaining in the preceding zone until material in a final material-containing zone has been contacted and allowing the partial water extract from each preceding zone to remain in stationary contact with the material in the corresponding successive zone for a dwell period, during which time the material in the successive zone is partially extracted; removing the water extract from the final zone; and mixing a thickening agent with said water extract to form a paste.

4. A process for the intermittent countercurrent extraction with cold water of a material selected from the group consisting of coffee, malt coffee, chicory and mixtures thereof which consists essentially of introducing cold water into one of a plurality of zones containing said material and allowing the water to remain in stationary contact with said material in the zone for a dwell period during which time the material is partially extracted thus forming a partial water extract; sequentially adding cold water to said one zone to force the partial water extract by displacement into successive zones containing material which is less extracted than that remaining in the preceding zone until material in a final material-containing zone has been contacted and allowing the partial water extract from each preceding zone to remain in stationary contact with the material in the corresponding successive zone for a dwell period, during which time the material in the successive zone is partially extracted; removing the water extract from the final zone; and mixing said water extract in the cold with a thickening agent.

5. A process for the intermittent countercurrent extraction with water of a material selected from the group consisting of coffee, malt coffee, chicory and mixture thereof which consists essentially of introducing cold water into one of a plurality of zones containing said material and allowing the water to remain in stationary contact with said material in the zone for a dwell period during which time the material is partially extracted thus forming a partial water extract; sequentially adding cold water to said one zone to force the partial water extract by displacement into successive zones containing material which is less extracted than that remaining in the preceding zone until material in a final material-containing zone has been contacted and allowing the partial water extract from each preceding zone to remain in stationary contact with the material in the corresponding successive zone for a dwell period, during which time the material in the successive zone is partially extracted; and removing the water extract from the final zone; mixing said water extract with a thickening agent and heating the resulting mixture until a paste consistency is obtained.

6. A process for the intermittent countercurrent extraction with cold water of freshly ground coffee which consists essentially of introducing cold water into one of a plurality of zones containing said coffee and allowing the water to remain in stationary contact with the coffee in said zone for a dwell period, during which time the ground coffee is partially extracted thus forming a partial water extract; sequentially adding cold water to said one zone to force the partial water extract by displacement into successive zones containing ground coffee which is less extracted than that remaining in the preceding zone until ground coffee in a final coffee-containing zone has been contacted and allowing the partial water extract from each preceding zone to remain in stationary contact with the ground coffee in the corresponding successive zone for a dwell period, during which time the coffee in the successive zone is partially extracted; removing the water extract from the final zone; mixing said water extract with gelatin, heating the resulting mixture until the viscosity of said mixture has been slightly increased and thereupon cooling said mixture.

7. A process for the intermittent countercurrent extraction with water of freshly ground coffee which consists essentially of introducing cold water into one of a plurality of zones containing said coffee and allowing the water to remain in stationary contact with the coffee in said zone for a dwell period, during which time the ground coffee is partially extracted thus forming a partial water extract; sequentially adding cold water to said one zone to force the partial water extract by displacement into successive zones containing ground coffee which is less extracted than that remaining in the preceding zone until ground coffee in a final coffee-containing zone has been contacted and allowing the partial water extract from each preceding zone to remain in stationary contact with the ground coffee in the corresponding successive zone for a dwell period, during which time the coffee in the successive zone is partially extracted; removing the water extract from the final zone; mixing said water extract with a hot thickening agent and cooling the resultant mixture until a paste consistency is obtained.

8. A process for the intermittent countercurrent extraction with water of freshly ground coffee which consists essentially of introducing cold water into one of a plurality of zones containing said coffee and allowing the water to remain in stationary contact with the coffee in said zone for a dwell period, during which time the ground coffee is partially extracted thus forming a partial water extract; sequentially adding cold water to said one zone to force the partial water extract by displacement into successive zones containing ground coffee which is less extracted than that remaining in the preceding zone until ground coffee in a final coffee-containing zone has been contacted and allowing the partial water extract from each preceding zone to remain in stationary contact with the ground coffee in the corresponding successive zone for a dwell period, during which time the coffee in the successive zone is partially extracted; removing the water extract from the final zone; stirring said water extract into a solution of gelatin in boiling water, and continuing the stirring while cooling the resultant mixture to room temperature.

9. A process for the intermittent countercurrent extraction with water of a material selected from the group consisting of coffee, malt coffee, chicory and mixtures thereof which consists essentially of introducing cold water into one of a plurality of zones containing said material and allowing the water to remain in stationary contact with said material in the zone for a dwell period during which time the material is partially extracted thus forming a partial water extract; sequentially adding cold water to said one zone to force the partial water extract by displacement into successive zone containing material which is less extracted than that remaining in the preceding zone until material in a final material-containing zone has been contacted and allowing the partial water extract from each preceding zone to remain in stationary contact with the material in the corresponding successive zone for a dwell period, during which time the material in the successive zone is partially extracted; removing the water extract from the final zone; mixing said water extract with a thickening agent to form a paste and mixing an antioxidant with said paste.

10. A process for the intermittent countercurrent extraction with water of a material selected from the group consisting of coffee, malt coffee, chicory and mixtures thereof which consists essentially of introducing cold water into one of a plurality of zones containing said material and allowing the water to remain in stationary contact with said material in the zone for a dwell period during which time the material is partially extracted thus forming a partial water extract; sequentially adding cold water to said one zone to force the partial water extract by displacement into successive zones containing material which is less extracted than that remaining in the preceding zone until material in a final material-containing zone has been contacted and allowing the partial water extract from each preceding zone to remain in stationary contact wtih the material in the corresponding successive zone for a dwell period, during which time the material in the successive zone is partially extracted; removing the water extract from the final zone; mixing said water extract with a thickening agent to form a paste and mixing a preserving agent with said paste.

References Cited in the file of this patent

UNITED STATES PATENTS

| | | |
|---|---|---|
| 1,687,112 | Slocum et al. | Oct. 9, 1928 |
| 1,891,383 | Giffen et al. | Dec. 20, 1932 |
| 1,925,159 | Wendt | Sept. 5, 1933 |
| 2,324,526 | Morgenthaler | July 20, 1943 |
| 2,338,608 | Weisberg | Jan. 4, 1944 |
| 2,340,758 | Kappenberg | Feb. 1, 1944 |
| 2,420,615 | Palmer | May 13, 1947 |
| 2,515,730 | Ornfelt | July 18, 1950 |